Patented May 30, 1933

1,911,945

UNITED STATES PATENT OFFICE

GEORGE HOLLAND ELLIS, HENRY CHARLES OLPIN, AND ERNEST WILLIAM KIRK, OF SPONDON, NEAR DERBY, ENGLAND, ASSIGNORS TO CELANESE CORPORATION OF AMERICA, A CORPORATION OF DELAWARE

MANUFACTURE OF NAPHTHOQUINONE OR DERIVATIVES THEREOF

No Drawing. Application filed January 24, 1929, Serial No. 334,854, and in Great Britain February 7, 1928.

This invention relates to the synthesis of 1.4-naphthoquinone, 5.8-dihydroxy-1.4-naphthoquinone and other derivatives of 1.4-naphthoquinone, for example the halogen derivatives.

According to the present invention 1.4-naphthoquinone or derivatives thereof are produced by simultaneous ring closure and oxidation of $\beta$-benzoyl-propionic acid or derivatives thereof, having a free ortho position in the benzene nucleus.

The $\beta$-benzoyl-propionic acid and its derivatives are most conveniently produced by condensation of succinic anhydride or derivatives thereof, for example mono- or dichlor or brom succinic anhydride, with benzene or derivatives thereof having two free ortho positions, for instance 1.4-dihydroxybenzene (hydroquinone), 1-methyl-2.5-dihydroxybenzene (hydrotoluquinone), 1.2-dimethyl-3.6-dihydroxybenzene (hydro-o-xyloquinone), p-aminophenol, p-chlorphenol, 3.4-dichlorphenol etc. This preliminary condensation to benzoylpropionic acid or a derivative thereof, may be effected by treatment with aluminium chloride, while the simultaneous ring closure and oxidation is most conveniently carried out by treatment with sulphuric acid or with boric and sulphuric acids.

The best and most economic method of carrying the present invention into effect is to conduct the whole synthesis from succinic anhydride or its derivatives and benzene or its derivatives to 1.4-naphthoquinone or its derivatives, i. e. condensation, ring closure and oxidation, in one operation. This may be brought about by treatment of the starting materials with boric and sulphuric acids.

The following example illustrates the process of the invention as applied to the manufacture of naphthazarin, but it is not to be regarded as in any way limitative:—

Example 50 parts of succinic anhydride, 20 parts of hydroquinone and 15 parts of boric acid crystals are dissolved in 500 parts of 96% sulphuric acid and heated to 120° C. with stirring for 6–8 hours. The initial yellow colour rapidly turns to vivid crimson and gradually increases in intensity. In order to isolate the product the melt is cooled and poured on to chopped ice, when the product separates as a blackish-brown precipitate. It may be purified by dissolving in boiling water and filtering. The purified naphthazarin separates out on cooling.

The above reaction probably occurs in two stages, the first stage being the condensation of succinic anhydride with hydroquinone to form dihydroxy-benzoyl propionic acid, and the second the oxidation and ring closure of the dihydroxy-benzoyl propionic acid to form napthazarin.

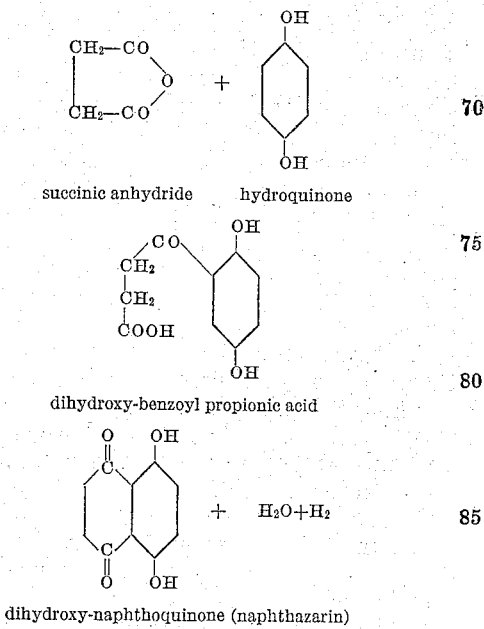

In the appended claims the term "1.4-naphthoquinones" includes, in addition to the unsubstituted 1.4-naphthoquinone itself, derivatives thereof; the term "$\beta$-benzoylpropionic acids" likewise includes unsubstituted $\beta$-benzoyl-propionic acid and derivatives thereof containing the free carboxyl group; and the term "a succinic anhydride" includes both unsubstituted and substituted succinic anhydrides.

What we claim and desire to secure by Letters Patent is:—

1. Process for the manufacture of 1.4-naphthoquinones, comprising subjecting β-benzoyl propionic acids having a free ortho position in the benzene nucleus to simultaneous ring closure and oxidation by condensing and oxidizing the same in the presence of a strong mineral acid.

2. Process for the manufacture of 1.4-naphthoquinones, comprising subjecting β-benzoyl propionic acids having a free ortho position in the benzene nucleus to simultaneous ring closure and oxidation by means of sulphuric acid.

3. Process for the manufacture of 1.4-naphthoquinones, comprising subjecting β-benzoyl propionic acids having a free ortho position in the benzene nucleus to simultaneous ring closure and oxidation by means of sulphuric and boric acids.

4. Process for the manufacture of 1.4-naphthoquinones, comprising condensing a succinic anhydride with a compound of the benzene series having two free ortho positions and subjecting to simultaneous ring closure and oxidation by condensing and oxidizing the same in the presence of a strong mineral acid.

5. Process for the manufacture of 1.4-naphthoquinones, comprising condensing, ring closing and oxidizing in one operation a succinic anhydride and a compound of the benzene series having two free ortho positions by condensing and oxidizing the same in the presence of a strong mineral acid.

6. Process for the manufacture of 1.4-naphthoquinones, comprising condensing, ring closing and oxidizing in one operation by means of sulphuric and boric acids a succinic anhydride and a compound of the benzene series having two free ortho positions.

7. Process for the manufacture of naphthazarin, comprising condensing, ring closing and oxidizing in one operation succinic anhydride and hydroquinone by condensing and oxidizing the same in the presence of a strong mineral acid.

8. Process for the manufacture of naphthazarin, comprising heating succinic anhydride with hydroquinone in presence of sulphuric and boric acids.

9. Process for the manufacture of 1.4-naphthoquinones, comprising subjecting para di-substituted β-benzoyl propionic acids having a free ortho position in the benzene nucleus to simultaneous ring closure and oxidation by condensing and oxidizing the same in the presence of a strong mineral acid.

10. Process for the manufacture of 1.4-naphthoquinones, comprising condensing succinic anhydride with a para di-substituted compound of the benzene series having two free ortho positions, and subjecting to simultaneous ring closure and oxidation by condensing and oxidizing the same in the presence of a strong mineral acid.

11. Process for the manufacture of 1.4-naphthoquinones, comprising condensing, ring closing and oxidizing in one operation by means of sulfuric and boric acids succinic anhydride and a para di-substituted compound of the benzene series having two free ortho positions.

In testimony whereof we have hereunto subscribed our names.

GEORGE HOLLAND ELLIS.
HENRY CHARLES OLPIN.
ERNEST WILLIAM KIRK.